United States Patent
Ogawa

(10) Patent No.: US 9,673,748 B2
(45) Date of Patent: Jun. 6, 2017

(54) MOTOR CONTROL DEVICE AND MOTOR CONTROL METHOD

(71) Applicant: Mitsubishi Electric Corporation, Tokyo (JP)

(72) Inventor: Kenji Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/781,611

(22) PCT Filed: Feb. 18, 2014

(86) PCT No.: PCT/JP2014/053773
§ 371 (c)(1),
(2) Date: Oct. 1, 2015

(87) PCT Pub. No.: WO2015/125214
PCT Pub. Date: Aug. 27, 2015

(65) Prior Publication Data
US 2016/0043683 A1 Feb. 11, 2016

(51) Int. Cl.
*G05B 9/02* (2006.01)
*H02P 29/024* (2016.01)
(Continued)

(52) U.S. Cl.
CPC ............ *H02P 29/024* (2013.01); *H02M 1/10* (2013.01); *H02P 6/001* (2013.01); *H02P 29/026* (2013.01);
(Continued)

(58) Field of Classification Search
CPC ...... G05B 9/02; G05B 19/4062; B25J 9/1674; B25J 19/06; G05D 1/0077
(Continued)

(56) References Cited

U.S. PATENT DOCUMENTS 5,493,868 A * 2/1996 Kikuiri ................. H02P 29/026
318/807
2009/0309575 A1 12/2009 Suzuki et al.

FOREIGN PATENT DOCUMENTS

JP 63-107486 A 5/1988
JP 5-137367 A 6/1993
(Continued)

OTHER PUBLICATIONS

Communication dated Nov. 17, 2015, issued by the Korean Intellectual Property Office in corresponding Korean Application No. 10-2015-7031802.
(Continued)

*Primary Examiner* — Kawing Chan
*Assistant Examiner* — Bradley Brown
(74) *Attorney, Agent, or Firm* — Sughrue Mion, PLLC; Richard C. Turner

(57) ABSTRACT

A motor control circuit controls an operation of a motor based on an input voltage and a control parameter. A voltage-abnormality detection unit detects abnormality of the input voltage by comparing the input voltage with an allowable voltage range. A memory stores therein a plurality of allowable voltage range candidates made to correspond to a plurality of reference voltages and a plurality of control parameter candidates made to correspond to the plurality of reference voltages. A reference-voltage acquisition unit acquires reference voltage information specifying one of the plurality of reference voltages. A selector selects one of the plurality of allowable voltage range candidates from the plurality of allowable voltage range candidates, corresponding to the one reference voltage, as the allowable voltage range and one of the plurality of control parameter candidates from the plurality of control parameter candidates,
(Continued)

corresponding to the one reference voltage, as the control parameter based on the reference voltage information.

9 Claims, 6 Drawing Sheets

(51) Int. Cl.
*H02P 6/00* (2016.01)
*H02M 1/10* (2006.01)
*G05B 19/4062* (2006.01)
*B25J 9/16* (2006.01)
*G05D 1/00* (2006.01)
*H02M 1/32* (2007.01)

(52) U.S. Cl.
CPC ......... *H02P 29/0241* (2016.02); *B25J 9/1674* (2013.01); *G05B 9/02* (2013.01); *G05B 19/4062* (2013.01); *G05D 1/0077* (2013.01); *H02M 1/32* (2013.01)

(58) Field of Classification Search
USPC ........................................................ 318/563
See application file for complete search history.

(56) References Cited

FOREIGN PATENT DOCUMENTS

| | | | |
|---|---|---|---|
| JP | 7-135798 A | | 5/1995 |
| JP | 8-130895 A | | 5/1996 |
| JP | 08130895 A | * | 5/1996 |
| JP | 8-205569 A | | 8/1996 |
| JP | 08205569 A | * | 8/1996 |
| JP | 2000-92880 A | | 3/2000 |
| JP | 2003-164190 A | | 6/2003 |
| JP | 2009-303321 A | | 12/2009 |

OTHER PUBLICATIONS

Japanese Notice of Reasons for Rejection for JP 2014-534693 dated Sep. 2, 2014.
International Search Report for PCT/JP2014/053773 dated May 13, 2014.
Communication dated Jan. 20, 2017 issued by the State Intellectual Property Office of the People's Republic of China in counterpart application No. 201480026348.6.

* cited by examiner

MOTOR CONTROL DEVICE AND MOTOR CONTROL METHOD

CROSS REFERENCE TO RELATED APPLICATIONS

This application is a National Stage of International Application No. PCT/JP2014/053773 filed Feb. 18, 2014, the contents of which are incorporated herein by reference in their entirety.

FIELD

The present invention relates to a motor control device and a motor control method.

BACKGROUND

A motor control device that executes operation control of a servo motor, such as a servo amplifier, is known. The following method is known as a method for setting a gain such as a current loop required for the control in the motor control device.

Patent Literature 1 discloses a servo motor control device that compares a command signal toward a driving circuit of a servo motor with a feedback signal to control a servo gain. This servo motor control device includes a calculation unit, a detection unit, and a parameter setting unit. The calculation unit sequentially calculates the servo gain and determines an operation command to the driving circuit. The detection unit detects a power-supply voltage of the servo motor. The parameter setting unit determines the weight of a control parameter of the operation command in accordance with the detected power-supply voltage.

In the technique described in Patent Literature 1, it is necessary to always detect the power-supply voltage and sequentially calculate the servo gain and the control parameter of the operation command. As a result, motor control becomes complicated, which is not favorable.

Patent Literature 2 discloses a motor control device. This motor control device includes a conversion unit, an inverter main circuit, a setting unit, and a compensation unit. The conversion unit converts an AC voltage to a DC voltage. The DC voltage is input to the inverter main circuit. The output of the inverter main circuit is connected to a motor. The setting unit sets a power-supply voltage value in use environment or a corresponding value. The compensation unit changes the control gain of the motor based on the value set by the setting unit.

CITATION LIST

Patent Literatures

Patent Literature 1: Japanese Patent Application Laid-open No. S63-107486
Patent Literature 2: Japanese Patent Application Laid-open No. H5-137367

SUMMARY

Technical Problem

In the technique described in Patent Literature 2, motor control may become unstable because of unintended fluctuation of the power-supply voltage. When the power-supply voltage decreases, for example, torque insufficiency, delay in a control system caused by decreasing of the frequency response, and the like may occur. Further, when the power-supply voltage increases, current control may become unstable and cause abnormal noise or vibration.

An object of the present invention is to provide a technique that can realize stable motor control with respect to a plurality of kinds of power-supply voltages.

Solution to Problem

In one aspect of the present invention, a motor control device is provided. The motor control device includes a motor control circuit, a voltage-abnormality detection unit, a memory, a reference-voltage acquisition unit, and a selector. The motor control circuit controls an operation of a motor based on an input voltage and a control parameter. The voltage-abnormality detection unit detects abnormality of the input voltage by comparing the input voltage with an allowable voltage range. The memory stores therein a plurality of allowable voltage range candidates made to correspond to a plurality of reference voltages and a plurality of control parameter candidates made to correspond to the plurality of reference voltages. The reference-voltage acquisition unit acquires reference voltage information specifying one reference voltage from the plurality of reference voltages. The selector, based on the reference voltage information, selects one of the plurality of allowable voltage range candidates, corresponding to the one reference voltage, as the allowable voltage range; and selects one of the plurality of control parameter candidates, corresponding to the one reference voltage, as the control parameter.

In another aspect of the present invention, a motor control method is provided. The motor control method includes a step of controlling an operation of a motor based on an input voltage and a control parameter and a step of detecting abnormality of the input voltage by comparing the input voltage with an allowable voltage range. A plurality of allowable voltage range candidates made to correspond to a plurality of reference voltages and a plurality of control parameter candidates made to correspond to the plurality of reference voltages are stored in a memory. The motor control method further includes: a step of acquiring reference voltage information specifying one reference voltage from the plurality of reference voltages; and a step of selecting one of the plurality of allowable voltage range candidates, corresponding to the one reference voltage, as the allowable voltage range and one of the plurality of control parameter candidates, corresponding to the one reference voltage, as the control parameter based on the reference voltage information.

Advantageous Effects of Invention

According to the present invention, stable motor control becomes possible with respect to a plurality of kinds of power-supply voltages.

DESCRIPTION OF EMBODIMENTS

Exemplary embodiments of the present invention will be explained below with reference to the accompanying drawings.

First Embodiment

Figure 1:
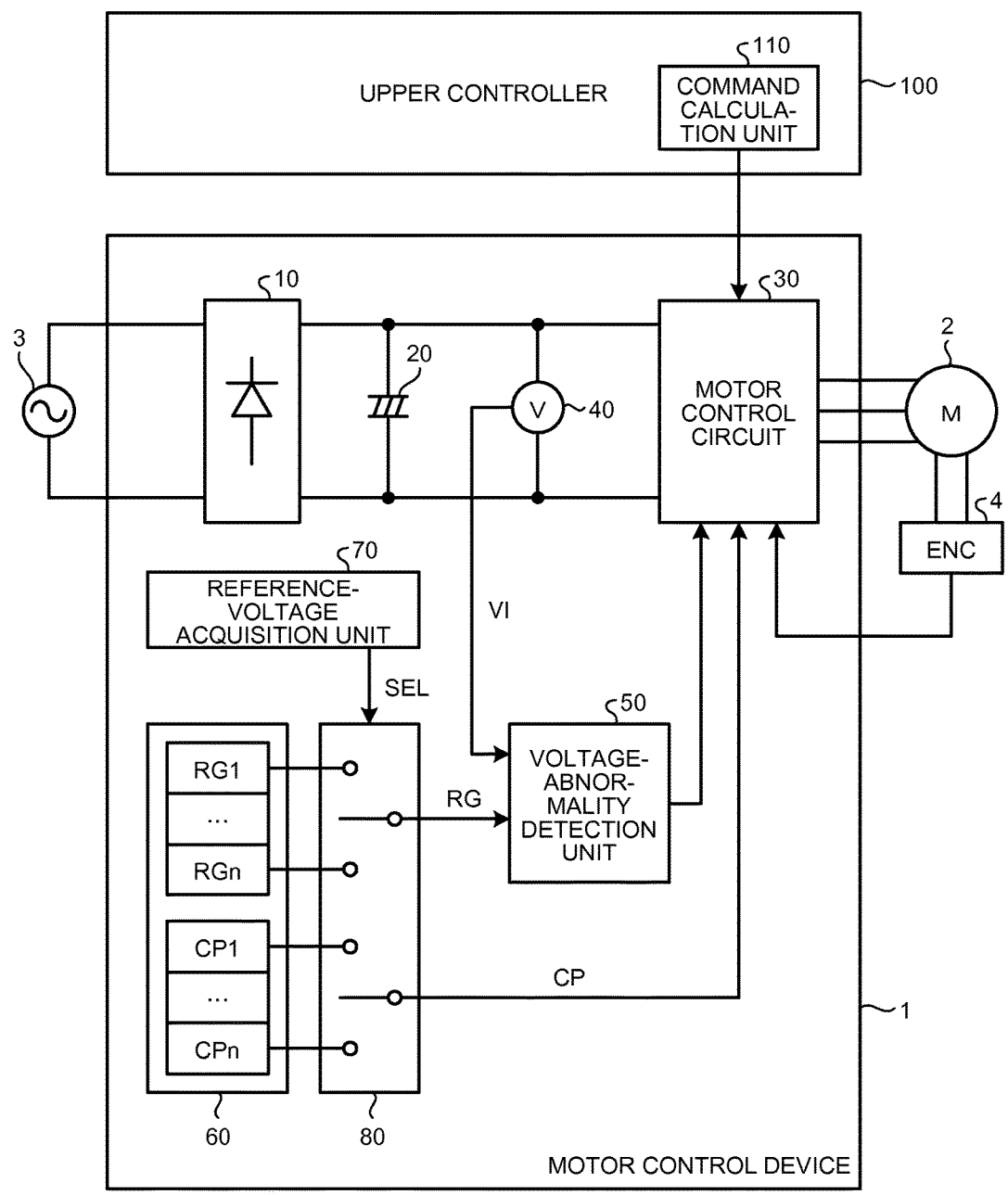
FIG. 1 is a block diagram illustrating an example of a system configuration including a motor control device according to a first embodiment of the present invention.

FIG. 1 is a block diagram illustrating an example of a system configuration including a motor control device 1 according to a first embodiment of the present invention. The motor control device 1 executes operation control of a motor 2. For example, the motor 2 is a servo motor, and the motor control device 1 is a servo amplifier.

In the example illustrated in FIG. 1, the motor control device 1 is connected between the motor 2 and an AC power supply 3. The motor control device 1 is also connected to an upper controller 100. The upper controller 100 includes a command calculation unit 110 that calculates commands such as a position command and a speed command. The motor control device 1 receives a command from the upper controller 100 and, in accordance with the command, executes the operation control of the motor 2. Typically, position information detected by a position detector 4 such as an encoder attached to the motor 2, is fed back to the motor control device 1 and, based on the position information and the command, feedback control is executed.

More specifically, the motor control device 1 includes a rectifier 10, a smoothing capacitor 20, a motor control circuit 30, a voltage detector 40, a voltage-abnormality detection unit 50, a memory 60, a reference-voltage acquisition unit 70, and a selector 80.

An AC voltage supplied from the AC power supply 3 is input to the rectifier 10. The output of the rectifier 10 is connected to a P-side power line and an N-side power line. The smoothing capacitor 20 is connected between the P-side power line and the N-side power line. By the rectifier 10 and the smoothing capacitor 20, the AC voltage is converted to a DC voltage. The obtained DC voltage is input to the motor control circuit 30. The DC voltage input to the motor control circuit 30 is hereinafter referred to as "input voltage VI".

The motor control circuit 30 is connected to the motor 2 and controls the operation of the motor 2 based on the input voltage VI. Typically, the motor control circuit 30 includes an inverter that converts the input voltage VI to a three-phase AC voltage by PWM control, and supplies the three-phase AC voltage to the motor 2, thereby executing the operation control of the motor 2. In this operation control, the motor control circuit 30 receives commands such as a position command and a speed command, output from the upper controller 100 (the command calculation unit 110) and also receives position information related to the motor 2 that is fed back from the position detector 4. The motor control circuit 30 executes feedback control based on the commands and the position information.

As parameters required for the operation control of the motor 2 in the motor control circuit 30, a control gain (an integral gain or a proportional gain) of a control loop (a current loop or a speed loop) is cited. As other parameters, the maximum current and the maximum speed of the motor 2 are cited. Those parameters are hereinafter referred to as "control parameter CP". That is, the control parameter CP includes at least one of the control gain of the control loop in the motor control circuit 30, the maximum current of the motor 2, and the maximum speed of the motor 2. It can be said that the operation control of the motor 2 by the motor control circuit 30 is also based on the control parameter CP. According to the first embodiment, as described later, the control parameter CP can be switched.

The voltage detector 40 is provided between the smoothing capacitor 20 and the motor control circuit 30, and detects the input voltage VI input to the motor control circuit 30.

It should be noted that the input voltage VI is not always constant but may be subject to unintentional fluctuation. The value of the input voltage VI that is designed in the specification is hereinafter referred to as "reference voltage VR". That is, the input voltage VI does not always match the reference voltage VR. However, the fluctuation of the input voltage VI from the reference voltage VR makes the operation control of the motor 2 unstable. In a case where the input voltage VI is considerably smaller than the reference voltage VR, for example, torque insufficiency, delay in a control system caused by decreasing of the frequency response, and the like may occur. Further, in a case where the input voltage VI is considerably larger than the reference voltage VR, current control becomes unstable and abnormal noise or vibration may occur.

In this connection, according to the first embodiment, the voltage-abnormality detection unit 50 is provided for detecting abnormality of the input voltage VI. The voltage-abnormality detection unit 50 monitors the input voltage VI detected by the voltage detector 40 and detects the abnormality of the input voltage VI. In order to detect the abnormality of the input voltage VI described above, a concept of "allowable voltage range RG (an abnormal voltage level)" is introduced in the first embodiment.

Figure 2:
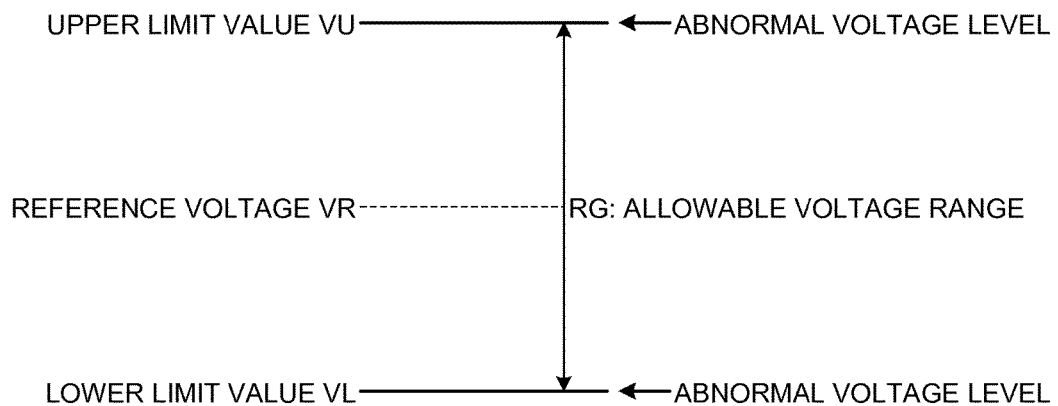
FIG. 2 is a schematic diagram for explaining an allowable voltage range (an abnormal voltage level).

With reference to FIG. 2, the allowable voltage range RG (the abnormal voltage level) will be explained. The allowable voltage range RG is a range of the input voltage VI that can be allowed from the viewpoint of control stability with respect to a certain reference voltage VR, and is defined as a fixed range including the reference voltage VR. More specifically, as illustrated in FIG. 2, the allowable voltage range RG is defined as a range between an upper limit value VU higher than the reference voltage VR and a lower limit value VL lower than the reference voltage VR. It can be said that the upper limit value VU and the lower limit value VL of the allowable voltage range RG are the abnormal voltage levels.

The voltage-abnormality detection unit 50 compares the input voltage VI with the allowable voltage range RG (that is, the upper limit value VU and the lower limit value VL), thereby detecting abnormality of the input voltage VI. When the input voltage VI deviates from the allowable voltage range RG, that is, the input voltage VI exceeds the upper limit value VU or is lower than the lower limit value VL, the voltage-abnormality detection unit 50 determines that the input voltage VI is abnormal. When having detected the abnormality of the input voltage VI, the voltage-abnormality detection unit 50 outputs an alarm signal to the motor control circuit 30.

The motor control circuit 30 that has received the alarm signal stops the operation control of the motor 2, for example. Thus, the motor control circuit 30 and the motor 2 can be prevented from being broken. Alternatively, in a case where the alarm signal indicates that "the input voltage VI is lower than the lower limit value VL", the motor control circuit 30 may perform a regenerative operation. Due to this configuration, the voltage of the smoothing capacitor 20, that is, the input voltage VI is increased, and it can be expected that the operation control of the motor 2 is stabilized.

The motor control device 1 according to the first embodiment is configured to be adaptable to a plurality of kinds of power-supply voltages. Specifically, the motor control device 1 has a function for automatically switching the control parameter CP and the allowable voltage range RG described above to appropriate ones in accordance with the power-source voltage (the reference voltage VR). Due to this configuration, motor control that is stable to a plurality of kinds of power-supply voltages can be executed. Configurations related to switching of the control parameter CP and the allowable voltage range RG are described below.

Figure 3:
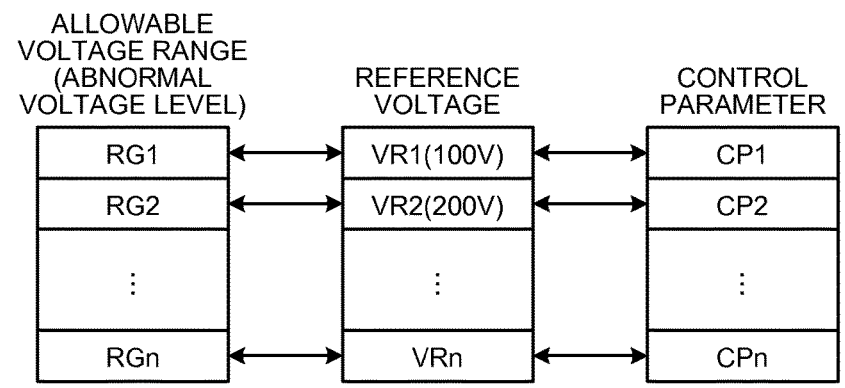
FIG. 3 is a schematic diagram illustrating a correspondence relation among a reference voltage, an allowable voltage range, and a control parameter.

As illustrated in FIG. 3, a plurality of kinds of reference voltages VR (for example, 100 V, 200 V, 400 V, . . . ) are considered in the first embodiment. Hereinafter, those plural reference voltages VR are referred to as "reference voltages VR1 to VRn", where n is an integer equal to 2 or larger than 2. For each of the plural reference voltages VR1 to VRn, the allowable voltage range RG and the control parameter CP that are appropriate therefor are prepared in advance.

The allowable voltage ranges RG prepared for the plural reference voltages VR1 to VRn are hereinafter referred to as "allowable voltage range candidates RG1 to RGn", respectively. In other words, the plural reference voltages VR1 to VRn and the plural allowable voltage range candidates RG1 to RGn are made to correspond to each other, respectively. Each allowable voltage range candidate RGi (i=1 to n) is designed appropriately for the corresponding reference voltage VRi, as illustrated in FIG. 2.

Similarly, the control parameters CP prepared for the plural reference voltages VR1 to VRn are hereinafter referred to as "control parameter candidates CP1 to CPn", respectively. In other words, the plural reference voltages VR1 to VRn and the plural control parameter candidates CP1 to CPn are made to correspond to each other, respectively. Each control parameter candidate CPi (i=1 to n) is optimized with respect to the allowable voltage range candidate RGi corresponding to the reference voltage VRi corresponding thereto. In other words, each control parameter candidate CPi (i=1 to n) is set to realize the optimal motor control within the allowable voltage range candidate RGi. It can be also said that the plural control parameter candidates CP1 to CPn and the plural allowable voltage range candidates RG1 to RGn are made to correspond to each other.

Referring back to FIG. 1, the memory 60 stores therein the plural allowable voltage range candidates RG1 to RGn and the plural control parameter candidates CP1 to CPn described above. The plural allowable voltage range candidates RG1 to RGn and the plural control parameter candidates CP1 to CPn that are stored in the memory 60 may be rewritable.

The reference-voltage acquisition unit 70 acquires reference voltage information SEL specifying one reference voltage VRs from the plural reference voltages VR1 to VRn. As a method for acquiring the reference voltage information SEL, various methods can be considered, as exemplified in later embodiments.

The selector 80 receives the reference voltage information SEL from the reference voltage acquisition unit 70. Based on the received reference voltage information SEL, the selector 80 automatically selects (switches) the allowable voltage range RG and the control parameter CP that are used for the operation control of the motor 2. The reference voltage information SEL can be regarded as a select signal for selecting the allowable voltage range RG and the control parameter CP.

More specifically, the selector 80 selects one allowable voltage range candidate RGs corresponding to the one reference voltage VRs specified by the reference voltage information SEL from the plural allowable voltage range candidates RG1 to RGn stored in the memory 60, and outputs the selected allowable voltage range candidate RGs as the allowable voltage range RG to the voltage-abnormality detection unit 50. The voltage-abnormality detection unit 50 performs abnormality detection for the input voltage VI by using the allowable voltage range RG selected by the selector 80.

The selector 80 also selects one control parameter candidate CPs corresponding to the one reference voltage VRs specified by the reference voltage information SEL from the plural control parameter candidates CP1 to CPn stored in the memory 60, and outputs the selected control parameter candidate CPs as the control parameter CP to the motor control circuit 30. The motor control circuit 30 executes the operation control of the motor 2 by using the control parameter CP selected by the selector 80.

As described above, according to the first embodiment, the voltage-abnormality detection unit 50 detects abnormality of the input voltage VI input to the motor control circuit 30. Specifically, the allowable voltage range RG is set for the reference voltage VR, and a decision is made whether the input voltage VI is within the allowable voltage range RG. When the input voltage VI is within the allowable voltage range RG, operation control of the motor 2 can be stably executed. On the other hand, when the input voltage VI deviates from the allowable voltage range RG, torque insufficiency and occurrence of abnormal noise or vibration can be avoided by taking an appropriate measure.

According to the first embodiment, for the plurality of kinds of reference voltages VR1 to VRn, the appropriate allowable voltage range candidates RG1 to RGn are prepared, respectively. The selector 80 automatically selects the allowable voltage range candidate RGs corresponding to the specified reference voltage VRs, and outputs the selected allowable voltage range candidate RGs as the allowable voltage range RG to the voltage-abnormality detection unit 50. Due to this configuration, stable motor control can be executed for the plurality of kinds of power-supply voltages (the reference voltages VR1 to VRn).

Further, according to the first embodiment, for the plurality of kinds of reference voltages VR1 to VRn, the appropriate control parameters candidates CP1 to CPn are also prepared, respectively. The selector 80 automatically selects the control parameter candidate CPs corresponding to the specified reference voltage VRs and outputs the selected control parameter candidate CPs as the control parameter CP to the motor control circuit 30. Due to this configuration, optimal motor control can be executed for the plurality of kinds of power-supply voltages (the reference voltages VR1 to VRn). In addition, it is not necessary to sequentially calculate the control parameter CP in accordance with fluctuation of the input voltage VI. Therefore, the calculation load can be reduced.

It can be said that the motor control device 1 according to the first embodiment automatically switches the control parameter CP and the allowable voltage range RG to appropriate ones in accordance with the power-supply voltage (the reference voltage VR). It is not necessary to prepare a different motor control device for every different power-supply voltage. This is preferable from the viewpoint of the cost.

Second Embodiment

Figure 4:
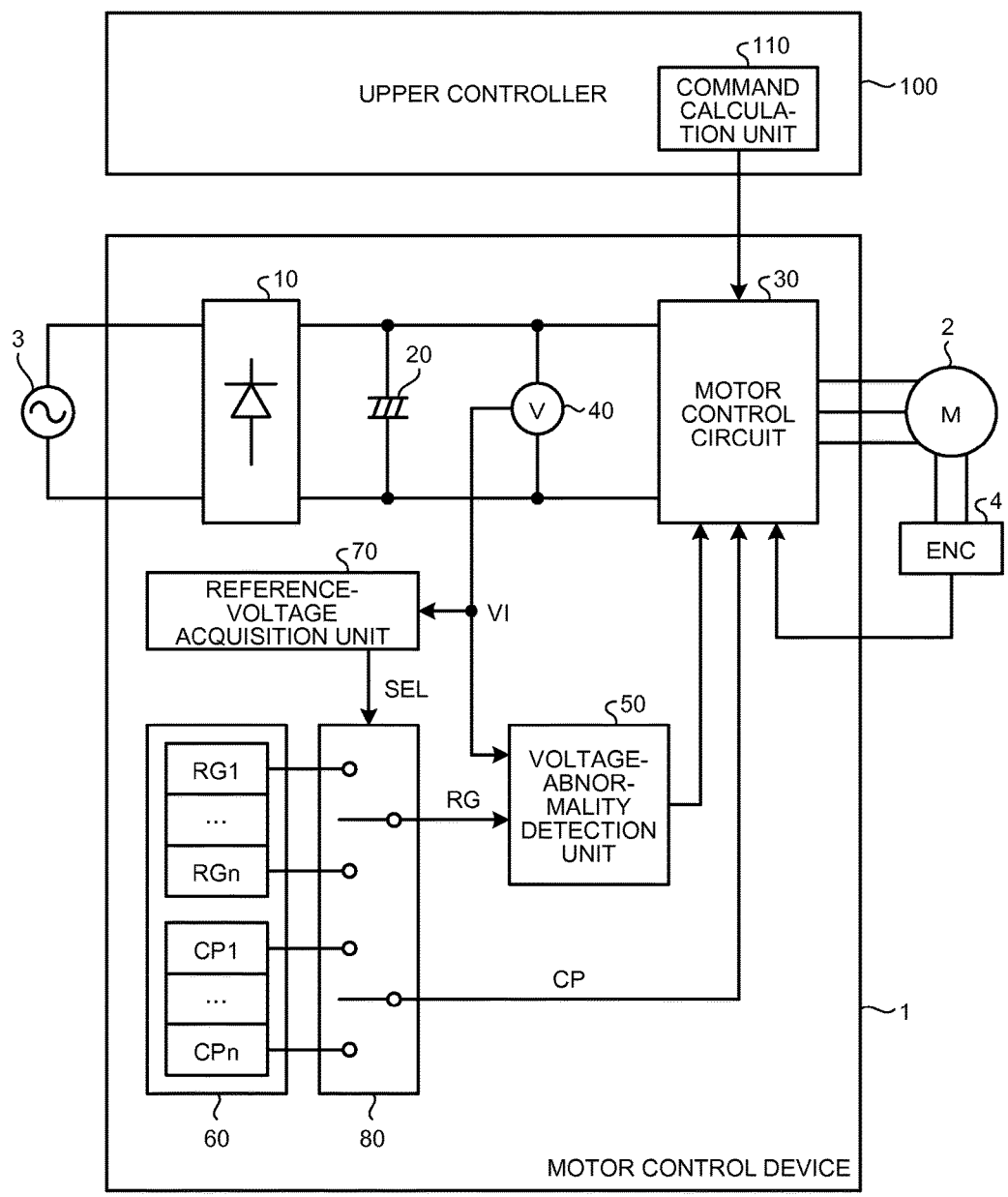
FIG. 4 is a block diagram illustrating an example of a system configuration including a motor control device according to a second embodiment of the present invention.

FIG. 4 is a block diagram illustrating an example of a system configuration including the motor control device 1 according to a second embodiment of the present invention. Descriptions redundant to those of the first embodiment are omitted as appropriate.

In the second embodiment, the reference-voltage acquisition unit 70 receives the input voltage VI detected by the voltage detector 40, at a moment the motor control device 1 is being turned on. The reference-voltage acquisition unit 70 then automatically determines (calculates) one reference voltage VRs in accordance with the input voltage VI at the moment power is being turned on. In this manner, the reference-voltage acquisition unit 70 can automatically acquire appropriate reference voltage information SEL.

Third Embodiment

Figure 5:
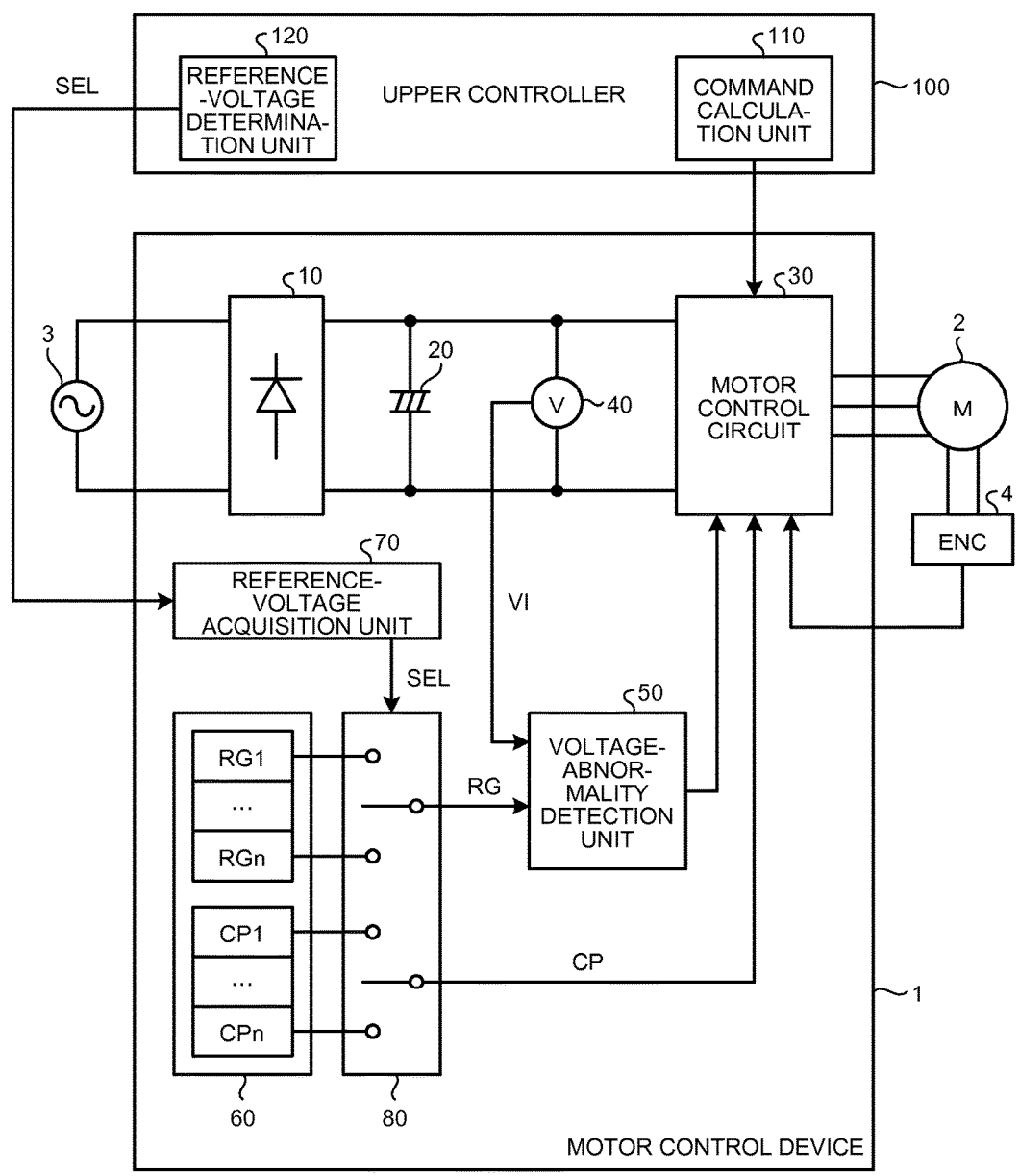
FIG. 5 is a block diagram illustrating an example of a system configuration including a motor control device according to a third embodiment of the present invention.

FIG. 5 is a block diagram illustrating an example of a system configuration including the motor control device 1 according to a third embodiment of the present invention. Descriptions redundant to those of the first embodiment are omitted as appropriate.

In the third embodiment, a reference-voltage determination unit 120 of the upper controller 100 determines one reference voltage VRs. The reference-voltage determination unit 120 then outputs (informs) reference voltage information SEL specifying the reference voltage VRs, to the motor control device 1. The reference-voltage acquisition unit 70 of the motor control device 1 receives the reference voltage information SEL from the upper controller 100. As the timing of transmission of the reference voltage information SEL from the upper controller 100 to the reference-voltage acquisition unit 70, the time point at which connection is established for the first time between the motor control device 1 and the upper controller 100 can be considered.

Figure 6:
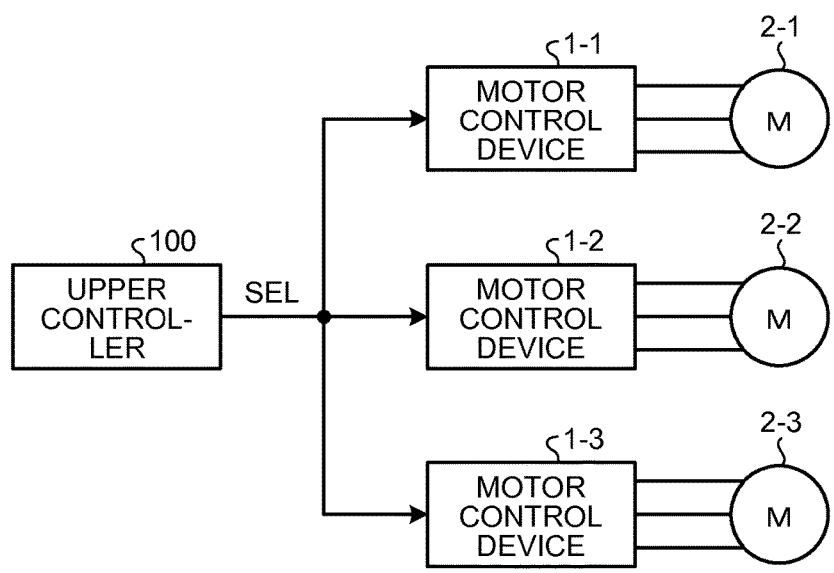
FIG. 6 is a block diagram illustrating an example of the system configuration according to the third embodiment of the present invention.

According to the third embodiment, it is possible to collectively set the reference voltage information SEL for a plurality of motor control devices 1. In an example illustrated in FIG. 6, for example, motor control devices 1-1, 1-2, and 1-3 execute operation control for motors 2-1, 2-2, and 2-3, respectively. In this case, the upper controller 100 connected in common to the motor control devices 1-1, 1-2, and 1-3 collectively transmits the reference voltage information SEL to the motor control devices 1-1, 1-2, and 1-3. Due to this configuration, it is possible to manage a plurality of axes collectively.

As a modification, it can be also considered that the upper controller 100 is configured to have the functions of the memory 60, the reference-voltage acquisition unit 70, and the selector 80. In this case, the upper controller 100 selects the control parameter CP and the allowable voltage range RG that are appropriate for one reference voltage VRs, and informs the motor control device 1 of the selected control parameter CP and the selected allowable voltage range RG.

Fourth Embodiment

Figure 7:
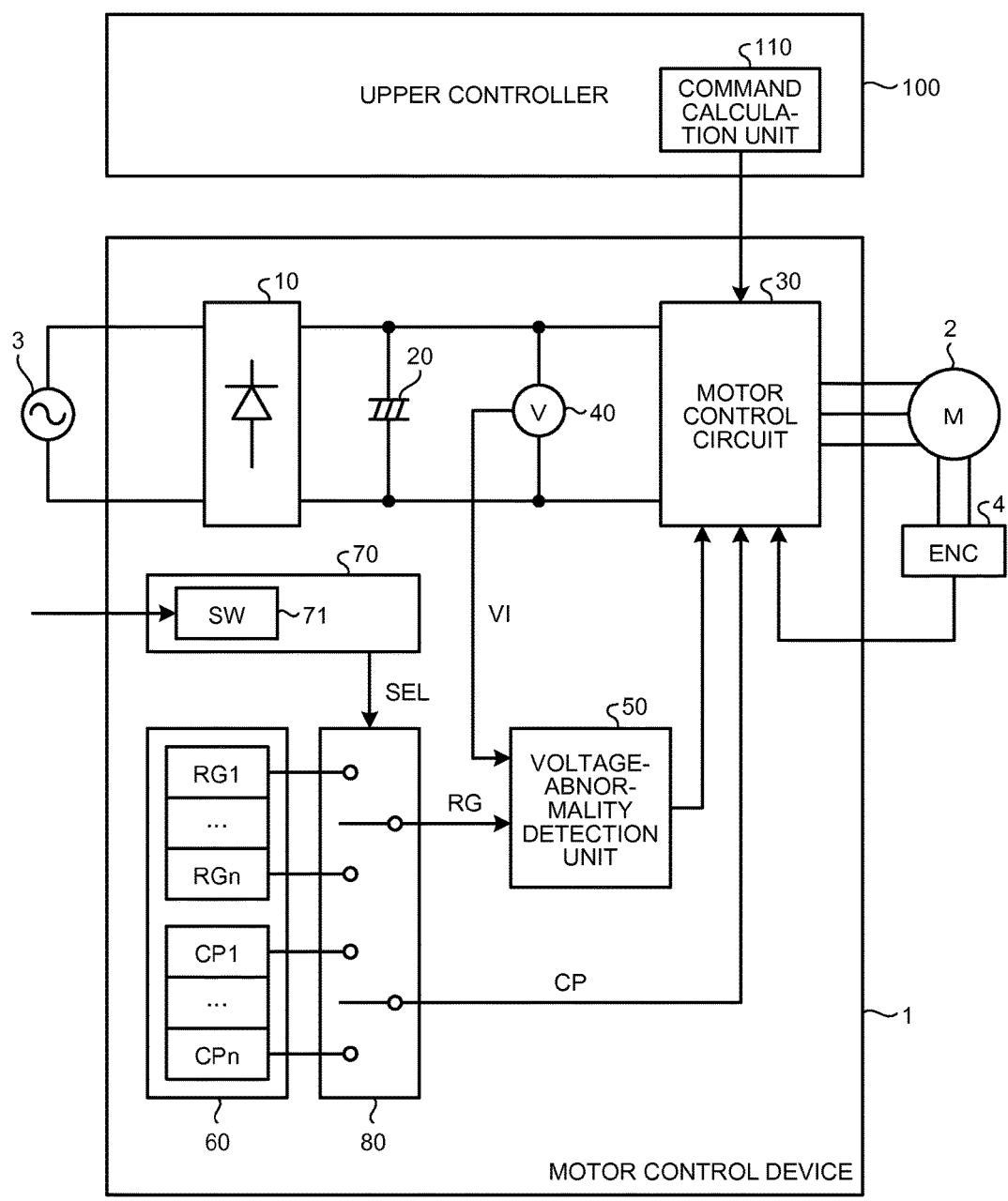
FIG. 7 is a block diagram illustrating an example of a system configuration including a motor control device according to a fourth embodiment of the present invention.

FIG. 7 is a block diagram illustrating an example of a system configuration including the motor control device 1 according to a fourth embodiment of the present invention. Descriptions redundant to those of the first embodiment are omitted as appropriate.

In the fourth embodiment, the reference-voltage acquisition unit 70 includes a changeover switch 71. The changeover switch 71 is a hardware switch operated by a user for switching the reference voltage VRs. The user operates the changeover switch 71, thereby being able to specify one reference voltage VRs from the plural reference voltages VR1 to VRn. In this case, the reference-voltage acquisition unit 70 selects the one reference voltage VRs from the plural reference voltages VR1 to VRn in accordance with the specification by the changeover switch 71, and generates the reference voltage information SEL.

Embodiments of the present invention have been described with reference to the accompanying drawings. Note that the present invention is not limited to the above embodiments and can be modified as appropriate without departing from the scope of the invention by persons skilled in the art.

REFERENCE SIGNS LIST 1 motor control device, 2 motor, 3 AC power supply, 4 position detector, 10 rectifier, 20 smoothing capacitor, 30 motor control circuit, 40 voltage detector, voltage-abnormality detection unit, 60 memory, 70 reference-voltage acquisition unit, 71 changeover switch, selector, 100 upper controller, 110 command calculation unit, 120 reference-voltage determination unit, CP control parameter, CP1 to CPn control parameter candidate, RG allowable voltage range, RG1 to RGn allowable voltage range candidate, SEL reference voltage information (select signal), VI input voltage, VL lower limit value, VR reference voltage, VR1 to VRn reference voltage, VU upper limit value.

The invention claimed is:

1. A motor control device comprising:
   a memory that stores therein a plurality of allowable voltage range candidates corresponding to a plurality of reference voltages, and a plurality of control parameter candidates corresponding to the plurality of reference voltages and corresponding to the plurality of allowable voltage range candidates;
   a reference-voltage acquisition unit that acquires reference voltage information specifying a reference voltage among the plurality of reference voltages;
   a selector that, based on the acquired reference voltage information:
      selects, from the stored plurality of allowable voltage range candidates, an allowable voltage range corresponding to the reference voltage;
      selects, from the stored plurality of control parameter candidates, a control parameter corresponding to the reference voltage; and
      outputs the selected allowable voltage range and the selected control parameter;
   a voltage-abnormality detection unit that:
      detects abnormality of an input voltage in response to the input voltage being outside the outputted allowable voltage range; and outputs the detection of the abnormality of the input voltage; and a motor control circuit that:
controls an operation of a motor by receiving a direct current (DC) voltage as the input voltage, converting the input voltage to an alternating current (AC) voltage based on the outputted control parameter, and supplying the AC voltage to the motor; and
stops the control of the operation of the motor, in response to the outputted detection of the abnormality of the input voltage.

2. The motor control device according to claim 1, wherein the reference-voltage acquisition unit generates the reference voltage information by calculating the reference voltage based on the input voltage at a moment power of the motor control device is being turned on.

3. The motor control device according to claim 1, wherein the reference-voltage acquisition unit receives the reference voltage information from an upper controller.

4. The motor control device according to claim 1, wherein the reference-voltage acquisition unit comprises a switch that is operated by a user, the reference-voltage acquisition unit generating the reference voltage information by selecting, from the plurality of reference voltages, the reference voltage that is specified by the switch.

5. The motor control device according to claim 1, wherein the selected allowable voltage range is defined by abnormal voltage levels representing respectively an upper limit value and a lower limit value of the selected allowable voltage range, and
the voltage-abnormality detection unit, when the input voltage exceeds the upper limit value or is lower than the lower limit value, detects the abnormality of the input voltage.

6. The motor control device according to claim 5, wherein the motor control circuit stops the control of the operation of the motor, when the input voltage exceeds the upper limit value.

7. The motor control device according to claim 5, wherein the motor control circuit stops the control of the operation of the motor, or performs a regenerative operation, when the input voltage is lower than the lower limit value.

8. The motor control device according to claim 1, wherein the selected control parameter is optimized to control the operation of the motor when the input voltage is within the selected allowable voltage range.

9. A motor control method comprising:
acquiring reference voltage information specifying a reference voltage among a plurality of reference voltages, a plurality of allowable voltage range candidates corresponding to the plurality of reference voltages, and a plurality of control parameter candidates corresponding to the plurality of reference voltages and corresponding to the plurality of allowable voltage range candidates, being stored in a memory;
based on the acquired reference voltage information:
selecting, from the stored plurality of allowable voltage range candidates, an allowable voltage range corresponding to the reference voltage;
selecting, from the stored plurality of control parameter candidates, a control parameter corresponding to the reference voltage; and
outputting the selected allowable voltage range and the selected control parameter;
detecting abnormality of an input voltage in response to the input voltage being outside the outputted allowable voltage range;
output the detection of the abnormality of the input voltage;
controlling, by a motor control circuit, an operation of a motor by receiving a direct current (DC) voltage as the input voltage, converting the input voltage to an alternating current (AC) voltage based on the outputted control parameter, and supplying the AC voltage to the motor; and
stopping the control of the operation of the motor, in response to the outputted detection of the abnormality of the input voltage.

* * * * *